Patented Apr. 19, 1927.

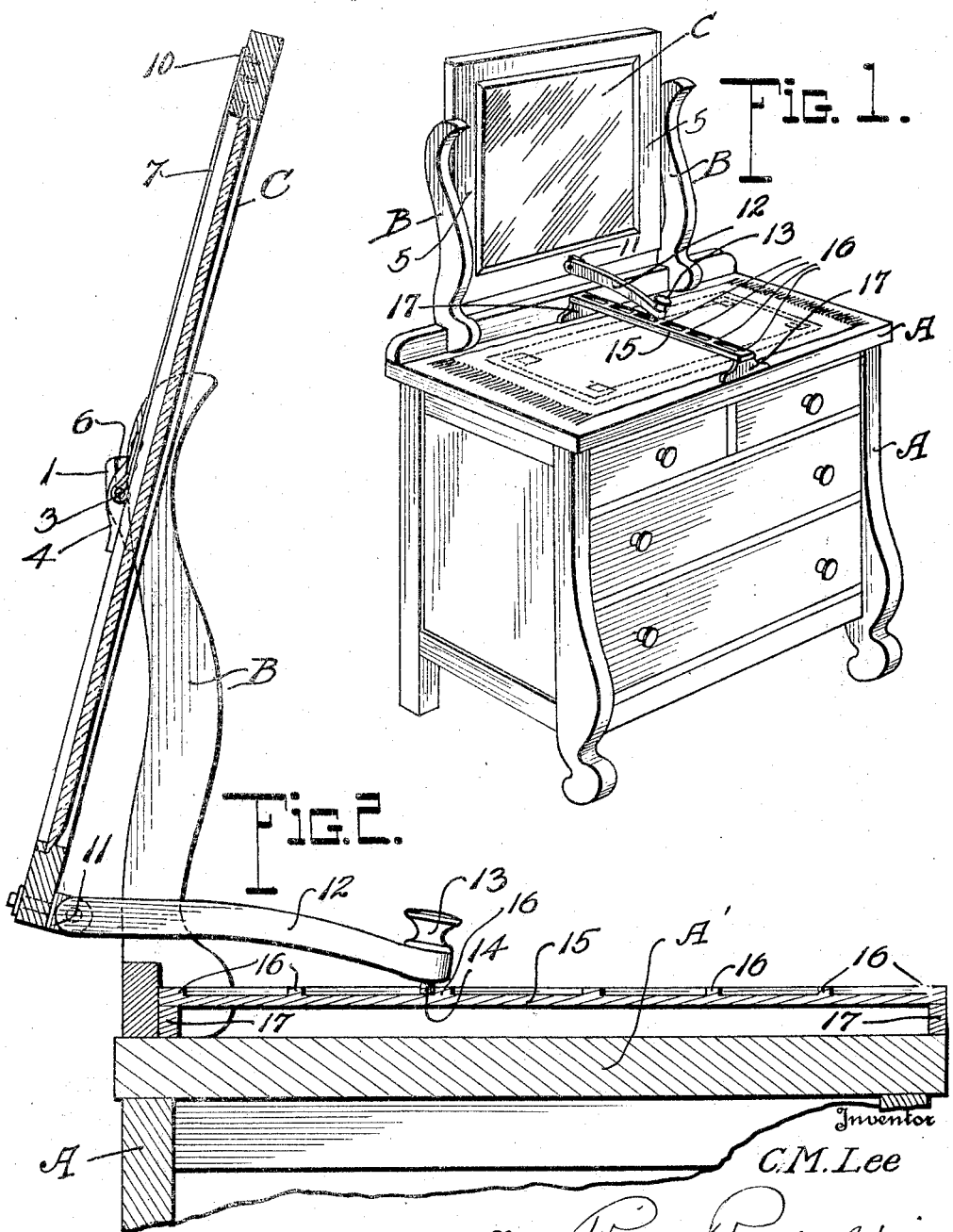

1,625,260

UNITED STATES PATENT OFFICE.

CHARLES M. LEE, OF SHREVEPORT, LOUISIANA.

MIRROR ADJUSTER.

Application filed March 12, 1926. Serial No. 94,245.

The present invention appertains to improvements in mirror adjusters, and is designed to provide means whereby mirrors, especially those which are mounted upon such articles of furniture as dressers, bureaus, etc., may be readily and conveniently adjusted.

It is quite well known that the supports on which mirrors are hung upon these articles of furniture are very light in construction and are subject to breakage, especially at the points of connection with the body of the article of furniture if any strain is placed upon the heavy mirror frame. Usually the mirror frame is fixedly connected to the supporting standards and in moving furniture it is necessary to unscrew or detach the standards from the furniture body if likelihood of damage is to be eliminated. However the process is not an easy one or takes such time that usually the moving is done without dismounting the mirror and injury is frequently involved.

Further than this, it is customary to provide a frictional binding at the pivotal connections of the mirror with the side supports so that the mirror may be angularly adjusted and held in a desired angular position. This also places heavy strains upon the connections of the standard and frequently involves breakage. To prevent this it is of course desirable to employ non-binding pivot connections or pivotal mountings for the mirror but when this is done it is difficult to adjust the mirror to a predetermined position and hold it at such adjustment. It has therefore been the object of this invention to provide adjusting means for mirrors whereby the frame may be quickly and easily shifted to any desired position while enabling such frame to be quickly and completely removed from its supports whenever it is desired.

A further object of my invention is to provide an adjustable mounting for large and heavy frames which will prevent their sagging and consequently likelihood of displacement of alignment and frictional binding of the frame pivots.

A still further object is to provide an adjustable mirror in which the adjusting means is so located in relation thereto as to reduce the tendency to impart strain or distortion to the frame and thereby reduce the liability of breakage of the glass.

Other and further objects and advantages of the invention will be hereinafter set forth and the novel features thereof defined by the appended claim.

In the drawings:

Figure 1 is a perspective view of a dresser having my invention applied thereto; and Figure 2 is a fragmentary vertical sectional view of a portion of a dresser and showing more clearly the adjusting feature of my invention.

Like reference characters designate corresponding parts throughout the several figures of the drawing.

Referring to the drawings, A denotes a bureau or dresser having the usual side standards or supports B upon which the swinging mirror frame and mirror C is mounted.

Secured to the supports B are the socket members 1. These socket members provide a bearing support for the cross rod 3 which is securely fastened by the clips or brackets 4 on the rear face of the mirror frame sides 5. The sockets referred to are provided with side walls 6 which limit the endwise movement of the cross rod 3 and position with accuracy the frame C between the vertical standards B. The cross rod 3 has rounded end pivots adapted to seat freely in the socket members 1.

Intermediate the ends of the cross rod is located a bracing strap, one end of which is looped around the rod while the other end is securely fastened to the top piece of the mirror frame, as indicated at 10. It can be readily seen that by this construction the projecting trunnions or pivots of the rod 3 are maintained in true alignment with the socket seats, thereby providing an easily adjustable mirror frame mounting. This special mounting is not herein specifically claimed, since it forms the subject matter of my copending divisional application for mirror mountings, filed of even date herewith.

For positioning the mirror at an angular relation, as shown in Figure 2 for example, I employ an adjusting bar 12 which is pivotally secured at one end to the mirror frame through the instrumentality of the bracket connection 11, while the other end is provided with means for engaging an abutment by which to maintain the position of the mirror where desired. The rod 12 is provided with a knob 13 on its upper surface for operating the bar in the positioning of the mirror, as will be clear from the drawings. Beneath the bar and adjacent its end is provided a projection or lug 14 which is designed to be engaged with any one of a series of abutments or stops 16 upon the upper surface of the bar 15 which is secured upon the upper surface A' of the bureau. This bar 15 is supported in spaced relation to the top A' of the bureau by the end blocks 17 and they may be secured to the surface in any desired manner. The bar 15 may be made of metal or of the same wood as used in the manufacture of the bureau body.

It will be apparent that in view of the fact that the bar 12 is pivotally connected to the frame of the mirror at a central point, there is no tendency to twist the frame in the use of the adjusting means comprehended by this invention and this necessarily eliminates likelihood of breakage of the glass which occurs from distortion of the frame in other forms of mirror mounting. Further, in the event of the necessity to remove the mirror frame it is only required that the mirror be raised to displace the pivot ends of the rod 3 from the sockets and the bar 12 is thereby released from its engaging position with reference to the cooperating bar 15. Under the conditions, whenever it is necessary to move the article of furniture the mirror will be dismounted because of the facility with which it can be displaced.

In the use of the mirror it is only necessary for the operator to grasp the knob 13 and by shifting it rearwardly the glass is positioned at the desired angle, whereupon the lug or projection 14 is engaged with a shoulder or stop 16 on the bar 15. In like manner the mirror may be adjusted to an angle on the opposite side of the vertical plane by pulling the arm 12 forwardly and engaging the lug 14 with the opposite side of a stop 16. A wide range of adjustment is thus provided. The spaced arrangement of the bar 15 with relation to the upper surface of the bureau enables the scarf or other covering to be placed beneath the same without interference, and it is understood that it is comprehended that this invention may be made in the nature of an article of manufacture and applied to articles of furniture already in use.

Having thus described my invention, what I claim as new is:—

A frame adjuster for furniture comprising an arm having means at one end for its pivotal connection to an adjustable frame and having at its other end a retaining projection, a bar having a solid body spaced above the top of the article of furniture and forming a support for said projection, and transverse shoulders upon the upper face of said bar against either side of which the projection is designed to abut to retain the frame at different opposite angular positions of adjustment relative to a vertical position thereof.

In testimony whereof I affix my signature.

CHARLES M. LEE.